US 6,497,633 B1

United States Patent
Butterfield et al.

(10) Patent No.: US 6,497,633 B1
(45) Date of Patent: Dec. 24, 2002

(54) CONTINUOUS MANUFACTURE OF PUSH TYPE CVT BELT BANDS UTILIZING SPIRAL WINDING & WELDING TO FORM TUBE AND SLITTING TUBE TO FORM BAND OF PREDETERMINED WIDTH

(75) Inventors: Roger P. Butterfield, Trumansburg, NY (US); Mark S. Ingianni, Groton, NY (US); Douglas S. Fornell, Ithaca, NY (US)

(73) Assignee: BorgWarner Inc., Troy, MI (US)

(*) Notice: Subject to any disclaimer, the term of this patent is extended or adjusted under 35 U.S.C. 154(b) by 0 days.

(21) Appl. No.: 09/464,656

(22) Filed: Dec. 15, 1999

(51) Int. Cl.[7] .................................................. F16G 1/00
(52) U.S. Cl. ....................... 474/237; 474/272; 29/33 D; 72/49
(58) Field of Search ............................. 29/33 B, 38.9, 29/33 D; 72/49, 370.06, 370.08, 392, 393

(56) References Cited

U.S. PATENT DOCUMENTS

| 2,233,233 A | * | 2/1941 | Williams | 219/6 |
| 3,106,177 A | * | 10/1963 | Nicolaisen | 113/35 |
| 3,797,088 A | * | 3/1974 | Stettler et al. | 29/159.1 |
| 4,590,652 A | * | 5/1986 | Harwood | 29/157 R |
| 5,127,885 A | | 7/1992 | Herbert et al. | |

FOREIGN PATENT DOCUMENTS

| EP | 0107238 | 5/1994 |
| JP | 58086946 | 5/1983 |
| JP | 6106 3327 | 4/1986 |
| JP | 08170692 | 7/1996 |

* cited by examiner

Primary Examiner—David A. Bucci
Assistant Examiner—Vicky A. Johnson
(74) Attorney, Agent, or Firm—Greg Dziegielewski; Hugh H. Abrams, Fitch, Even, Tabin & Flannery

(57) ABSTRACT

A method for the manufacture of a band for use in a CVT transmission. The band is formed by spiral winding a thin strip into a continuous tube and then welding the thin strip along the spiral winding. The individual bands are cut off of the continuous tube as it is formed. The invention also includes the bands formed by the method.

14 Claims, 3 Drawing Sheets

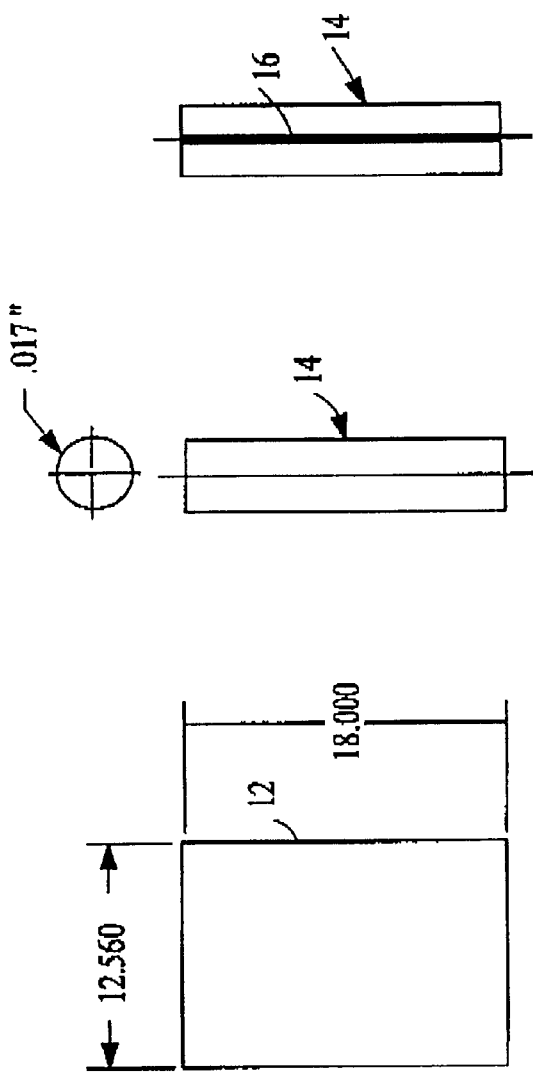
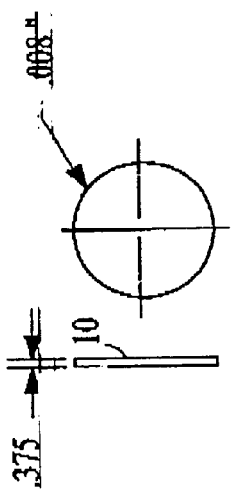

CONTINUOUS MANUFACTURE OF PUSH TYPE CVT BELT BANDS UTILIZING SPIRAL WINDING & WELDING TO FORM TUBE AND SLITTING TUBE TO FORM BAND OF PREDETERMINED WIDTH

BACKGROUND OF THE INVENTION

The continuously variable transmission (CVT) has become more widely employed as the technology has developed. The CVT transmission provides for a continuous variation of the transmission ratio between an input shaft and an output shaft, avoiding the necessity of a shifting type transmission, such as a standard shift requiring the engagement and disengagement of sets of gears to provide different gear ratios and an automatic transmission, requiring hydraulic operation of clutches in a planetary gear environment to provide different gear ratios.

A typical CVT transmission will employ an input pulley connected to the input shaft and an output pulley connected to the output shaft, with a continuous endless belt running between the pulleys. The distance between the faces of the pulleys will be varied to change the effective radius of the belt as it travels about the pulleys. The ratio of the effective radius at each pulley determines the transmission ratio of the CVT transmission.

As can be understood, the components of the CVT transmission must be precisely engineered and manufactured for proper operation. A common belt design is of the type having a plurality of trapezoidal shaped transverse elements or load blocks carried on one or more endless flexible carriers formed of nested metal bands. The sides of the transverse elements engage the faces of the pulleys while the carriers provide structure to the belt.

In a common design, the transverse elements have two slots, each slot extending inwardly from one of the pulley engaging faces thereof The transverse elements are mated with a carrier at one of the slots and positioned in a close packed configuration on the carrier side-by-side to fill up the entire length of the carrier. A carrier of equal diameter is then inserted in the slot on the opposite side of the transverse elements. The carriers are confined within the slots through the geometry of the slots and carriers, as well as the faces of the pulleys, to provide structure to the belt. Power is conveyed through the belt with the transverse elements acting against each other, constrained to remain in the belt by the carriers.

Typically, each carrier will be made up of a number of nested bands, for example 8 or 10. Each band in the carrier is of slightly different diameter than the other bands so that they are nested concentrically, typically with a small separation between each band for passage of lubricant.

A typical band utilized in a CVT belt may have a diameter of about eight inches, a width of ⅜ inches and a thickness of about 0.008 inches (8 mils). Such bands are commonly formed from rolling metal sheet material into a tube, laser welding the seam and then cutting individual bands from the tube and roll expanding the bands to the desired final diameter. While this process is effective, a need exists for a more cost effective technique to manufacture high quality bands.

SUMMARY OF THE INVENTION

In accordance with one aspect of the present invention, a method is provided for manufacturing bands including the steps of spiral winding thin metal strips into a continuous tube, welding the thin strip along the spiral winding and cutting bands off of the continuous tube.

Further aspects of the present invention include cutting bands off of the continuous tube by laser cutting or by mechanical slitting. The spiral winding can be performed over a mandrel and against feed rollers.

The mechanism for cutting bands off the continuous tube can be moved along the axis of the continuous tube as the tube is manufactured to properly cut the bands. Roll expanding of the bands can occur after they are cut off of the continuous tube or the continuous tube can be roll expanded itself before the bands are cut from the continuous tube.

In another aspect of the present invention, a band is provided which is manufactured by the process set forth above.

BRIEF DESCRIPTION OF THE DRAWINGS

FIGS. 1A–E are views of a known method of manufacturing a band for a CVT belt;

DETAILED DESCRIPTION OF THE INVENTION

Figure 2:
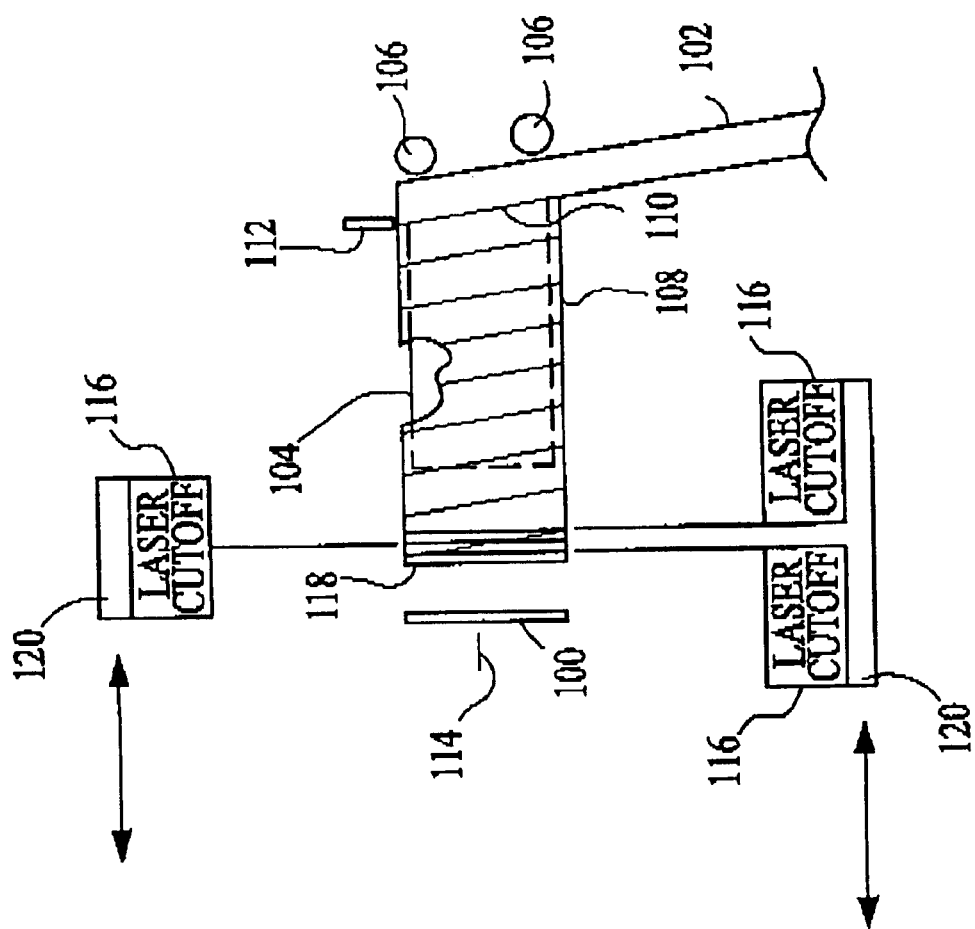
FIG. 2 is a side view of a method of manufacture and the resulting band for a CVT belt forming a first embodiment of the present invention.

With reference to FIGS. 1A–E, a known method for manufacturing a band 10 for a CVT belt will be described. As shown in FIG. 1A, the band 10 begins as a rectangular metal sheet 12. The sheet is then rolled into a tube 14 as shown in along seam 16, as seen in FIG. 1C. Individual bands 10 are then cut from the tube 14 to have a desired width, for example, ⅜ inch, as illustrated in FIG. 1D. The bands 10 are then roll expanded to the final diameter and thickness, as illustrated in FIG. 1E. As a specific example, the rectangular sheet 12 may be eighteen inches long and about twelve inches wide. The thickness of the sheet may be about 0.017 inches (17 mils). The roll expanding will reduce the thickness of the bands to about 0.008 inches (8 mils).

With reference now to FIG. 2, an improved method of manufacture and the resulting band thereof forming a first embodiment of the present invention will be described. The method is used to manufacture bands 100 for use in a belt for a CVT transmission. However, the method and bands can be used for other applications if desired.

The band 100 begins as a continuous thin metal strip 102 of the type readily available from steel manufacturers. The thin strip 102 is spirally wound over a mandrel 104, guided by support rollers 106 to form a continuous tube 108. The mandrel preferably has an outer diameter between 3–5 inches. The seam 110 formed between abutting edges of the thin strip 102 as it is wound on the mandrel 104 is welded by welder 112, preferably a laser welder. As can be appreciated, as the thin strip 102 is wound about the mandrel, the continuous tube 108 grows in the direction away from the support rollers 106 (to the left in FIG. 2). This movement is along the axis 114 of the continuous tube 108. A cutting device 116 is then used to cut the individual bands 100 off the end 118 of the continuous tube 108 spaced from the support rolls 106. The cutting device 116 is preferably either a laser cutter or a mechanical slitting device. One or more cutting devices 116 can be used, depending on the feed rate of the continuous tube 108 and the mounting and speed capabilities of the cutting device 116. The cutting device 116 is mounted on a moving support 120 which moves in the direction of axis 114 at the same speed the continuous tube 108 grows in order to provide bands with edges perpendicular the axis 114. It may also be desirable to have the cutting device 116 move radially about the continuous tube 108 to increase the speed of cutting and to balance the rate of operation of the cutting device 116 with the axial motion of the tube.

Subsequent to cutting the bands 100, the bands 100 are typically roll expanded to the desired final diameter and thickness, deburred and heat treated.

As one actual process incorporating the teachings of the present invention, the bands 100 after final forming may be approximately eight inches in diameter, 0.38 inch wide and have a thickness of 0.008 inches. The thin strip 102 has a strip width of about 2.3 inches and the mandrel is about 4 inches in diameter. The thickness of the thin strip is about 0.017 inches. The mandrel 104 is rotated at a rate of about eight revolutions per minute (rpm). The angle of the thin strip 102 wound on the mandrel is about 30 degrees relative to the axis 114. The movement of the continuous tube 108 along axis 114 is about 21 inches per minute. The bands 100 are cut with the width of ⅜ inch, having 0.020 inches of cut-off Kerf. This specific operation is for purposes of example only, and the present invention can be applied to many different dimensions.

Advantages of the present invention include the fact that the operation is continuous, which results in a high quality of bands produced for one piece of manufacturing equipment with limited human labor required, translating into reduced manufacturing costs. High quality and consistency are associated with a continuous operation, which will be consistent over a long period of time for a large number of bands. Once the operation is set up, the winding and welding operation can run consistently, preferably virtually unattended. In particular, the prior art technique required each individual section of steel to be manually aligned for welding, which can be a significant cause of variation in the resulting weld strength. The present invention also eliminates the waste associated with end effects of the weld with the prior known technique. All the material fed into the operation of the present invention is utilized in the final band product, with the exception of a very small amount of material lost in the process of cutting the tube into individual bands. The spiral weld produces a welded joint that is at a more acute angle relative to the direction of load carried by the band than the 90 degree weld found in the known manufacturing technique. This results in more weld length to carry the tensile load in the band, and less sensitivity to any minute flaws in the weld. The thin strip raw material is in a form that is readily available, and is easy to handle compared to the known technique of using wide, rectangular sections of sheet metal.

Figure 3:
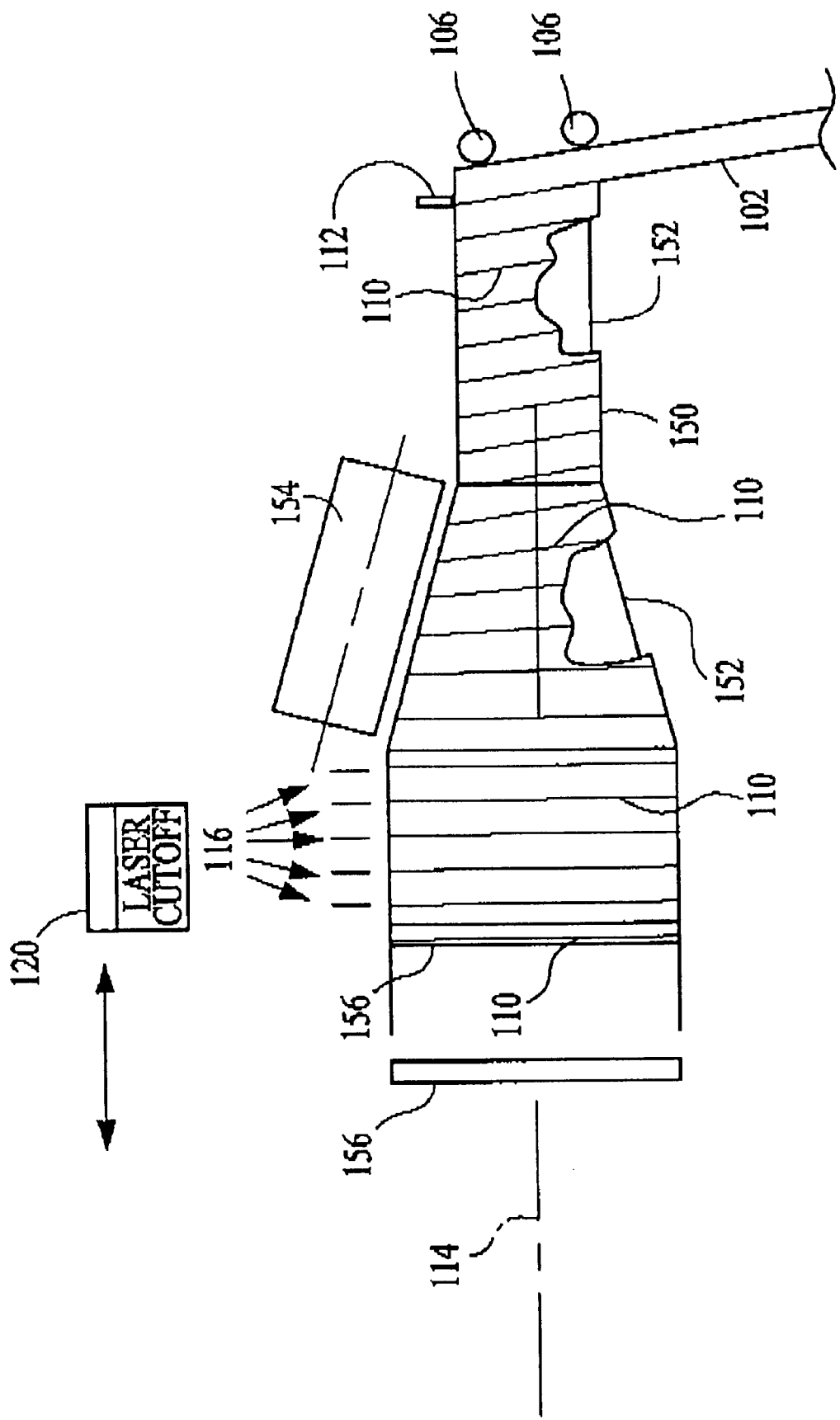
FIG. 3 is a side view of a method of manufacture and the resulting band for a CVT belt forming a second embodiment of the present invention.

With reference to FIG. 3, a second embodiment of the present invention will be described.

Many of the steps and features of the second embodiment are identical to that described above with regard to the first embodiment and are identified by the same reference numerals. However, the continuous tube 150 utilized in the second embodiment is roll expanded to a larger diameter in the tube form by a conical mandrel 152 and rolls 154. The bands 156 cut from the continuous tube 150 by cutting device 116 are thus near or at the final diameter of the band. This second embodiment requires high forces to roll a long length of tubing 150 to a larger diameter. However, if the forces are available, the manufacturing cost could be further reduced.

While certain embodiments of the apparatus and method of the present invention have been presented, it is appreciated that the invention is not limited thereto. Many variations, substitutions and amendments can be made to these embodiments without departing from the scope of the invention. Such variations, substitutions and amendments as would be apparent to one having ordinary skill in the art who will be familiar with the teachings disclosed herein are also deemed to fall within the scope and spirit of the present invention, as hereinafter claimed.

We claim:

1. A method for manufacturing a band for a CVT belt, said CVT belt including a plurality of transverse members, each transverse member having at least one slot, at least one carrier received in said at least one slot of said transverse members, said carrier formed of a plurality of bands, said transverse elements being assembled along said carrier in an adjacent relationship, comprising the steps of:

spiral winding a thin strip against a mandrel into a continuous tube;

welding the thin strip along the spiral winding;

expanding a section of the continuous tube to a substantially constant diameter; and cutting bands off of the expanded section of the continuous tube.

2. The method of claim 1 wherein the step of cutting includes the step of laser cutting the bands.

3. The method of claim 1 wherein the step of cutting the bands includes the step of mechanically slitting the bands.

4. The method of claim 1 wherein the step of spiral winding the thin strip into a continuous tube includes the step of spiral winding thin strip against a rotating mandrel.

5. The method of claim 1 wherein the step of spiral winding thin strip into a continuous tube includes the step of spiral winding the thin strip against a plurality of feed rollers.

6. The method of claim 1 wherein the step of cutting bands off of the continuous tube includes the steps of moving a band cutter along the axis of the continuous tube at the same speed the continuous tube is formed.

7. The method of claim 1 further comprising the step of expanding the bands cut off of the continuous tube.

8. A band for a CVT belt, said belt including a plurality of transverse elements, each of said transverse elements having at least one slot therein, and at least one carrier, said at least one carrier received in said at least one slot of said plurality of transverse elements, said transverse elements being assembled along said carrier in an adjacent relationship, said carrier formed of a plurality of bands, each of said bands formed by the method comprising the steps of:

spiral winding a thin strip against a mandrel into a continuous tube;

welding the thin strip along the spiral winding;

expanding a section of the continuous tube to a substantially constant diameter; and cutting the band off of the expanded section of the continuous tube.

9. The band of claim 8 further formed by laser cutting the band off of the continuous tube.

10. The band of claim 8 further formed by cutting the band off of the continuous tube by a mechanical slitter.

11. The band of claim 8 further formed by the method of spiral winding thin strip in a continuous tube against a rotating mandrel.

12. The band of claim 8 further formed by the method of spiral winding thin strip into a continuous tube against at least one feed roller.

13. The band of claim 8 formed by the method further comprising the step of moving a cutting mechanism cutting the band off of the continuous tube axially along the continuous tube at the rate the continuous tube is formed.

14. The band formed by the method of claim 8 further formed by expanding the band after the band is cut off of the continuous tube.

* * * * *